United States Patent
Aritsuka

[11] Patent Number: 5,999,430
[45] Date of Patent: Dec. 7, 1999

[54] INVERTER CONTROL UNIT

[75] Inventor: Tomohiko Aritsuka, Tokyo, Japan

[73] Assignee: Mitsubishi Denki Kabushiki Kaisha, Tokyo, Japan

[21] Appl. No.: 09/088,054

[22] Filed: Jun. 1, 1998

[30] Foreign Application Priority Data

Jan. 20, 1998 [JP] Japan ................................. 10-008688

[51] Int. Cl.$^6$ ....................................................... H02M 3/24
[52] U.S. Cl. ............................................................. 363/95
[58] Field of Search .................................. 363/95, 96, 97

[56] References Cited

U.S. PATENT DOCUMENTS

| | | | |
|---|---|---|---|
| 4,323,838 | 4/1982 | Pettigrew ................................. | 323/256 |
| 5,428,551 | 6/1995 | Trainor et al. .......................... | 323/255 |
| 5,619,121 | 4/1997 | Trainor .................................... | 323/256 |
| 5,701,239 | 12/1997 | Bjorklund et al. ....................... | 363/95 |
| 5,821,716 | 10/1998 | Okanik .................................... | 323/355 |

FOREIGN PATENT DOCUMENTS 2155436  6/1990  Japan .

Primary Examiner—Shawn Riley
Attorney, Agent, or Firm—Leydig, Voit & Mayer, Ltd.

[57] ABSTRACT

An inverter control unit includes a variable-tap-added step-down transformer. A DC energy unit is connected to a DC side of an inverter unit for supplying or consuming effective power. A control circuit controls a variable tap of the variable-tap-added step-down transformer. The control circuit includes a calculating circuit for calculating an effective value of a system voltage. A setting circuit sets an effective value command value. A deviation calculating circuit calculates a deviation between the effective value and the effective value command value. A tap command circuit operated by the system voltage outputs a tap command value corresponding to the deviation. A tap change judging circuit determines whether an inverter current at least equal to a rated value is output with a change in the variable tap. A tap command circuit changes the tap command value on the basis of the determination of the tap change judging circuit. A tap command value selecting circuit selects any one of the two tap command values. A tap changing circuit changes the variable tap on the basis of the tap command value selected by the tap command value selecting circuit.

11 Claims, 5 Drawing Sheets

INVERTER CONTROL UNIT

BACKGROUND OF THE INVENTION

1. Field of the Invention

The present invention relates to an inverter control unit that controls active power and/or reactive power.

2. Description of the Related Art

FIG. 4 shows a step-down transformer referred to as a "receiving transformer" and an inverter unit referred to as an "active filter", in Mitsubishi Electric Technical Report, Vol. 65, No. 6, 1991, "Arc Furnace Flicker Compensating Large-Capacitance Active Filter", p. 62 (582). FIG. 4 is a single phase wiring diagram showing FIG. 6 of the referenced publication without a higher harmonic filter and an arc furnace load.

In FIG. 4, reference numeral 5 denotes an invertor unit; 1, an a.c.-d.c. transformer of the inverter unit 5; 2, an inverter transformer of the inverter unit 5; 4, a system voltage source; and 3, a step-down transformer with a variable tap which links the inverter unit 1 to the system voltage source 4. The tap of the step-down transformer 3 is variably controlled by a control circuit 10. Reference numeral 6 denotes a d.c. capacitor of the inverter unit 5.

Reference numeral 7 denotes a d.c. energy unit connected to a d.c. side of the inverter unit 7 that supplies or consumes power to the inverter unit 5. The d.c. energy unit 7 is designed, for example, as follows:

a) a d.c. capacitor circuit;

b) a d.c. circuit connected directly to a d.c. energy storage means such as a battery;

c) a d.c. circuit connected indirectly to a d.c. energy storage means such as a battery, a chopper circuit and so on, and whose d.c. voltage is controlled to be constant;

d) a d.c. circuit that can be charged from an external power supply;

e) a d.c. circuit that can be discharged by a resistor or the like;

f) a d.c. circuit of an inverter unit whose a.c. side is connected to a power generator or the like;

g) a d.c. circuit of an inverter unit whose a.c. side is connected to an electric motor having an energy storage means such as a flywheel; and h) a transformer and a rectifier circuit having a an AVR (automatic voltage regulation) function.

FIG. 5 shows an example of the control circuit 10 that actuates the variable tap of the step-down transformer 3 with the variable tap.

In FIG. 5, reference numeral 11 denotes an effective value calculating circuit that calculates the effective value of a system voltage $V_0$; 12, a setting circuit for setting an effective value command value $V_0^*$ of the system voltage $V_0$; 13, a deviation calculating circuit for calculating a deviation $\Delta V_0$ between the effective value and a command value $V_0^*$ of the system voltage $V_0$; 14, a tap command circuit for instructing a change in tap position corresponding to the system voltage deviation $\Delta V$; and 18, a tap changing circuit for comparing an output of the tap command circuit 14 with a current tap to change the tap position of the step-down transformer 3 with a time delay element.

Then, the operation will be described.

The system voltage $V_0$ steadily goes up or down, for example, 5% of a rated voltage $V_0$, according to the operating state of a load connected to the system voltage source 4. In this state, a deviation between an output value from the effective value calculating circuit 11 for the system voltage $V_0$ and the effective value command value $V_0^*$ from the setting circuit 12 is calculated by the deviation calculating circuit 13. A tap position corresponding to the system voltage deviation $\Delta V_0$ is commanded from the tap command circuit 14, and the tap command value outputted from the tap command circuit 14 is compared with the current tap position for changing the tap with the time delay by the tap changing circuit 18. As a result, the step-down transformer 3 with a variable tap changes the voltage tap position with a load connected so that a secondary voltage $V_s$ is restrained to within a tap width $\Delta V_s$.

FIG. 6 shows a single phase wiring diagram of the step-down transformer 3 with a variable tap for one phase.

When the system voltage $V_0$ is equal to rated voltage, the variable tap produces a tap voltage $V_k$ shown in FIG. 6, but when the system voltage $V_0$ steadily goes up and is higher than a rated value, the variable tap is gradually moved toward $V_1$ shown in FIG. 6, step by step, in predetermined time intervals, and is controlled in such a manner that a secondary voltage $V_s$ is restrained within a given range of the rated voltage.

On the other hand, when the system voltage $V_0$ steadily goes down and is lower than the rated value, the variable tap is gradually moved toward $V_2$ shown in FIG. 6 step by step, in predetermined time intervals, and is controlled in such a manner that the secondary voltage $V_s$ is restrained within a given range of the rated voltage.

The a.c.-d.c. convertor 1 of the inverter unit 5 variably controls the fundamental wave voltage magnitude and the phase of an inverter voltage $V_a$ inputted through the inverter transformer 2 with respect to the fundamental wave voltage magnitude and the phase of the secondary voltage $V_s$ of the step-down transformer 3 with a variable tap. For facilitation of description, it is assumed that the winding ratio of the inverter transformer 2 is set to 1:1, and the magnitude of the secondary voltage $V_s$ is equal to the magnitude of the inverter voltage $V_a$ when the inverter current $I_a$ inputted through the invertor transformer 2 is zero.

Since a difference voltage magnitude $\Delta V_{xa}=V_a-V_s$ of the inverter voltage magnitude $V_a$ and the secondary voltage magnitude $V_s$ is applied to the inverter transformer 2 having an inductance $X_a$, an magnitude $I_a$ inverter is obtained by dividing the difference inverter current value $\Delta V_{xa}$ by the inductance $X_a$ is generated. In this situation, the phase of the inverter current $I_a$ is delayed with respect to the difference voltage, $\Delta V_{xa}$, by 90 degrees.

The magnitude and the phase of the inverter voltage $V_a$ generated by the inverter unit 5 is variably controlled according to a direction along which the active power and/or the reactive power flows. When the difference voltage $\Delta V_{xa}$ is identical in phase with the secondary voltage $V_s$, the inverter voltage $V_a$ increases in magnitud by $(V_s+\Delta V_{xa})$, and the inverter current $I_a$ is advnaced in phase by 90 degrees from secondary voltage $V_s$, resulting in a capacitor operation where the phase-advanced reactive power is generated.

When the difference voltage $\Delta V_{xa}$ is shifted in phase from the secondary voltage $V_s$ by about 180 degrees, the inverter voltage $V_a$ decreases in magnitude by $(V_s-\Delta V_{xa})$, and the inverter current Ia is delayed in phase by 90 degrees from the secondary voltage $V_s$, resulting in a reactor operation where phase-delayed reactive power is generated.

Also, when the difference voltage $\Delta V_{xa}$ is generated so that the inverter current Ia is in phase with the secondary voltage $V_s$, the inverter voltage $V_a$ becomes $\sqrt{(V_s^2+\Delta V_{xa}^2)}$, resulting in a converter operation where active power flows from the invertor unit 5.

When the difference voltage $\Delta V_{xa}$ is generated so that the invertor current $I_a$ is different in phase from the secondary voltage $V_s$ by about 180 degrees, the inverter voltage $V_a$ becomes $\sqrt{(V_s^2 + \Delta V_{xa}^2)}$, resulting in an inverter operation where active power flows from the invertor unit 5.

The inverter rated voltage $V_{a0}$ is defined as the inverter voltage $V_a$ when the inverter current $I_a$ is zero, and the capacitance of the inverter is defined by a product of the inverter current $I_a$ and the inverter rated voltage $V_{a0}$.

The relational expression (1) of the d.c. voltage $E_d$ and the inverter rated voltage $V_{a0}$ of the inverter unit 5 is as follows:

$$E_d \geq K \times \sqrt{2} \times V_{a0} \times \sqrt{((1 + X_a \cdot I_a \cdot \cos\theta)^2 + (X_a \cdot I_a \cdot \sin\theta)^2)} \quad (1)$$

where $\sin\theta = i_{p/\sqrt{(ip^2 + i_q^2)}}$, $\cos\theta = i_{q/\sqrt{(ip^2 + i_q^2)}}$, and $I_a = \sqrt{(i_p^2 + i_q^2)}$ are defined; $\theta = 0°$ is the convertor operation, $\theta = 90°$ is the capacitor operation, $\theta = 180°$ is the inverter operation, and $\theta = 270°$ is the reactor operation; and $i_p(>0)$ is the current of the converter operation, $i_q(>0)$ is the phase-advanced reactive current of the capacitor operation, $i_p(<0)$ is the current of the inverter operation, and $i_q(<0)$ is the reactive current of the reactor operation.

Also, a constant K is a constant determined by the structure or the control performance of the inverter unit 5. K>1 is normally satisfied, for example, K=1.2, but since it is a constant irrelevant to the subject matter of the present invention, K=1, which is an ideal state, is assumed.

Of the capacitor operation, the reactor operation, the converter operation and the inverter operation by the inverter unit 5, the inverter voltage magnitude Va or a peak value ($\sqrt{2} \times V_a$) becomes maximum during the capacitor operation.

At the time of the capacitor operation, from the relational expression (1) when $\theta = 90°$, the following expression is satisfied.

$$E_d \geq \sqrt{2} \times V_{a0} \times (1 + X_a \cdot I_q) \quad (2)$$

If an upper limit $I_{q1}$ of the generatable phase-advanced reactive current $I_q$ is a controllable maximum current or less of a power semiconductor device (hereinafter referred to as "device"), such as GTO or IGBT as a conversion element of the a.c.-d.c. converter 1, the following expression is satisfied.

$$I_{q1} = (E_d/(\sqrt{2} \times V_{a0}) - 1)/X_a \quad (3)$$

At the time of the converter operation or the inverter operation, the following expression is satisfied from the expression (1) at $\theta = 0°$ or $180°$.

$$E_d \geq \sqrt{2} \times V_{a0} \times \sqrt{(1 + (X_a \cdot I_p)^2)} \quad (4)$$

If an upper limit $I_{p1}$ of the generatable effective current $I_p$ is a controllable maximum current or less of the device, the following expression is satisfied.

$$I_{p1} = (\sqrt{((E_d/(\sqrt{2} \times V_{a0}))^2 - 1)})/X_a \quad (5)$$

The d.c. voltage $E_d$ of the inverter unit 5 is a constant determined by a device rated voltage or the structure of the inverter unit 5 such as the number of series connections. In the case where the inverter voltage peak value ($\sqrt{2} \times V_{a0}$) is designed to be a value having no margin with respect to the inverter d.c. voltage $E_d$, for example, in case of $E_d/(\sqrt{2} \times V_{a0}) = 1.1, X_{a=0.2}$, the magnitude $|i_{q1}|$ of the phase-advanced reactive current cannot equal the current magnitude value $|i_{p1}|$ such that $I_{p1} = 2.3$ when $I_{q1} = 0.5$.

In the conventional inverter control unit thus structured, since a reactive power higher than the rated reactive power determined in design cannot be obtained, the structure per se of the inverter is required to be enlarged, for example, by increasing the device rated voltage and the number of connected devices to increase the d.c. voltage.

Also, there arises a problem that an active power higher than the rated effective power determined in design cannot be obtained, etc.

SUMMARY OF THE INVENTION

The present invention has been made to solve the above problems with the prior art, and therefore an object of the present invention is to provide an inverter control unit producing a reactive power output higher than a rated reactive power and producing an active power output higher than rated active power.

In order to achieve the above object, according to the present invention, there is provided an inverter control unit which comprises: an inverter unit for controlling an effective power and/or a reactive power; a variable-tap-added step-down transformer for linking the above-described inverter unit to a power system transmission wire; a d.c. energy unit connected to a d.c. side of the above-described inverter unit for supplying or consuming the effective power; and control means for controlling a variable tap of the above-described variable-tap-added step-down transformer; wherein the above-described control means includes an effective value arithmetically operating circuit for arithmetically operating an effective value of a system voltage of the above-described power system; a setting circuit for setting an effective value command value of the system voltage; a deviation arithmetically operating circuit for arithmetically operating a deviation between the effective value and the effective value command value of the system voltage; a tap command circuit operative by the system voltage for outputting a tap command value corresponding to the above-described deviation with a time delay element; a tap change judging circuit for judging whether an inverter current of a rated value or more is outputted with a change in the variable tap of the above-described variable-tap-added step-down transformer, or not; an inverter tap command circuit for changing the tap command value with the time delay element on the basis of the judgment result of the above-described tap change judging circuit; a tap command value selecting circuit for selecting any one of the tap command value from the above-described tap command circuit due to the above-described system voltage and the tap command value from the above-described inverter tap command circuit; and a tap changing circuit for changing the variable tap of the above-described variable-tap-added step-down transformer on the basis of the tap command value selected by the above-described tap command value selecting circuit.

Also, a fixed-capacitance capacitor equipment is provided at an output side of the above-described variable-tap-added step-down transformer.

Further, a reactive power compensating unit having a variable capacitance is provided at an output side of the above-described variable-tap-added step-down transformer.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
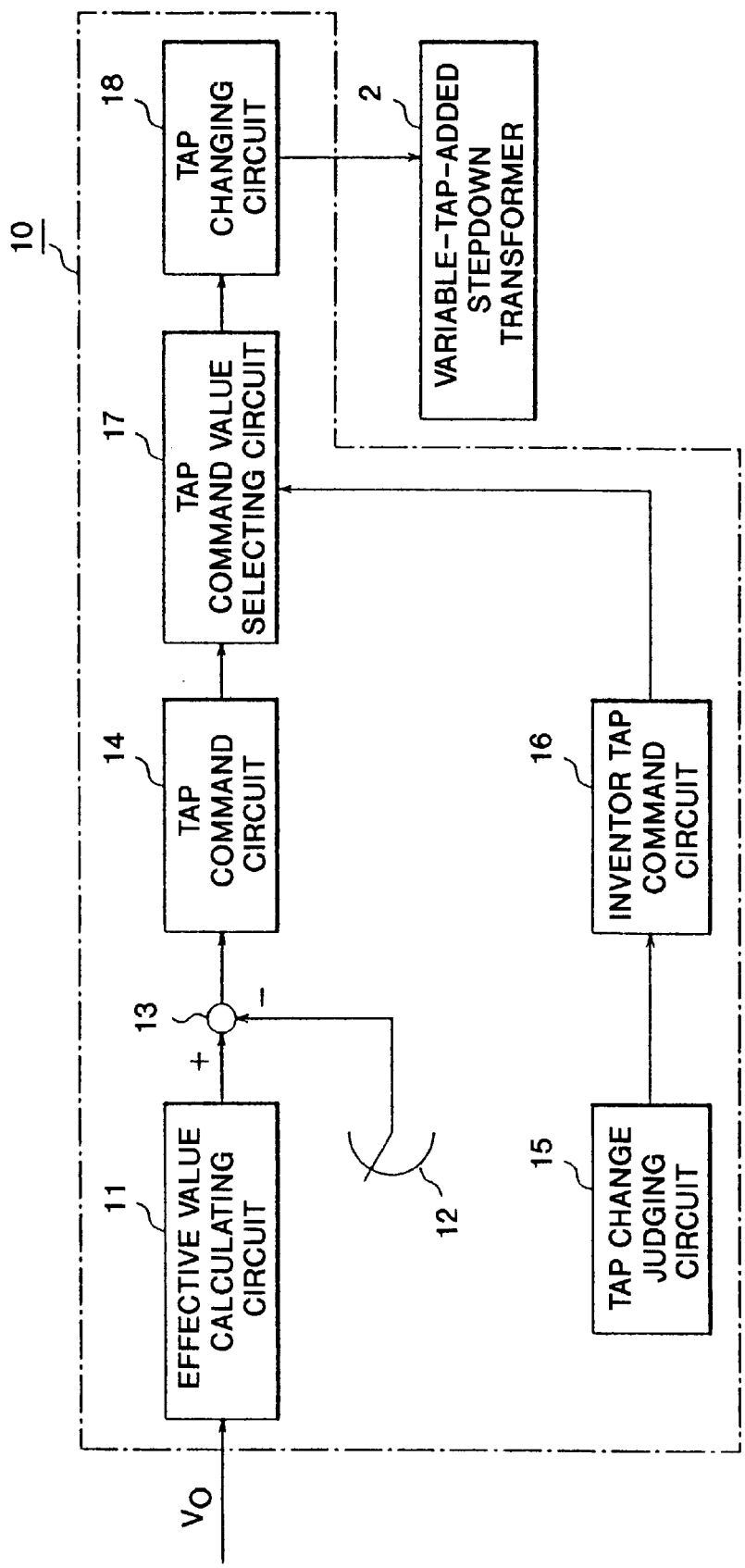
FIG. 1 is an inner structural diagram showing a control circuit according to a first embodiment of the present invention.
Figure 4:
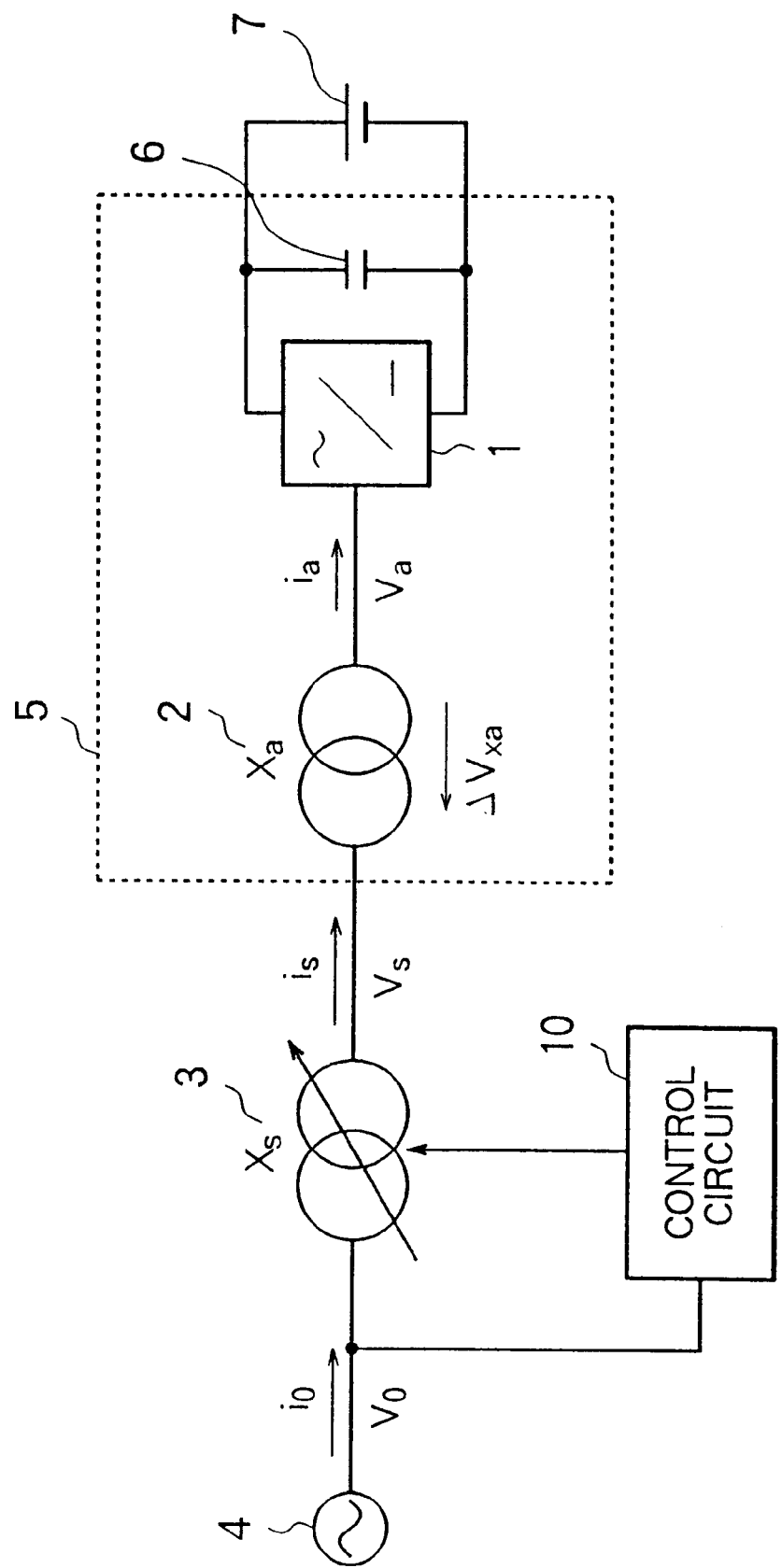
FIG. 4 is a single phase wiring diagram showing an equipment associated with an inverter unit.
Figure 5:
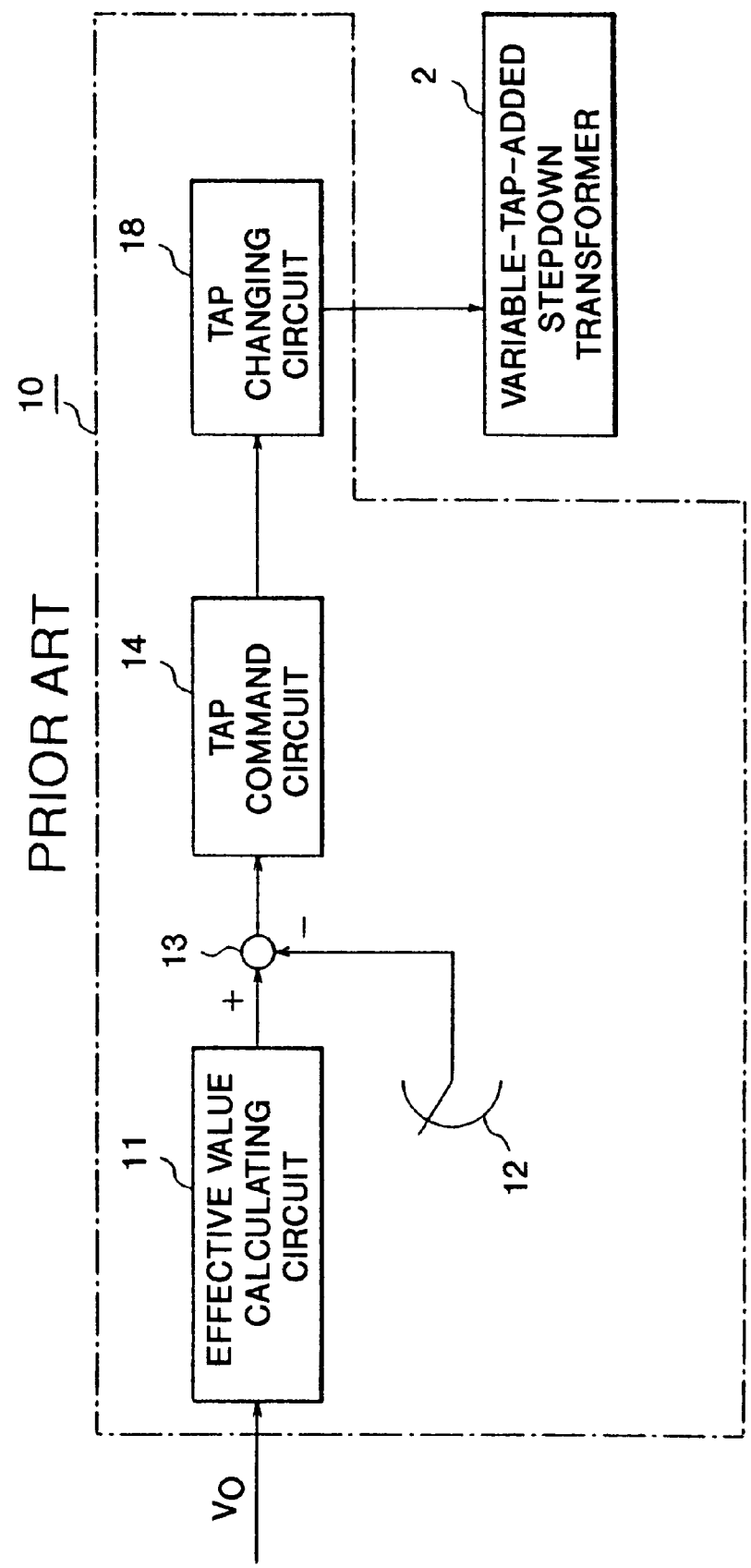
FIG. 5 is an inner structural diagram showing a control circuit of a conventional variable-tap-added step-down transformer.
Figure 6:
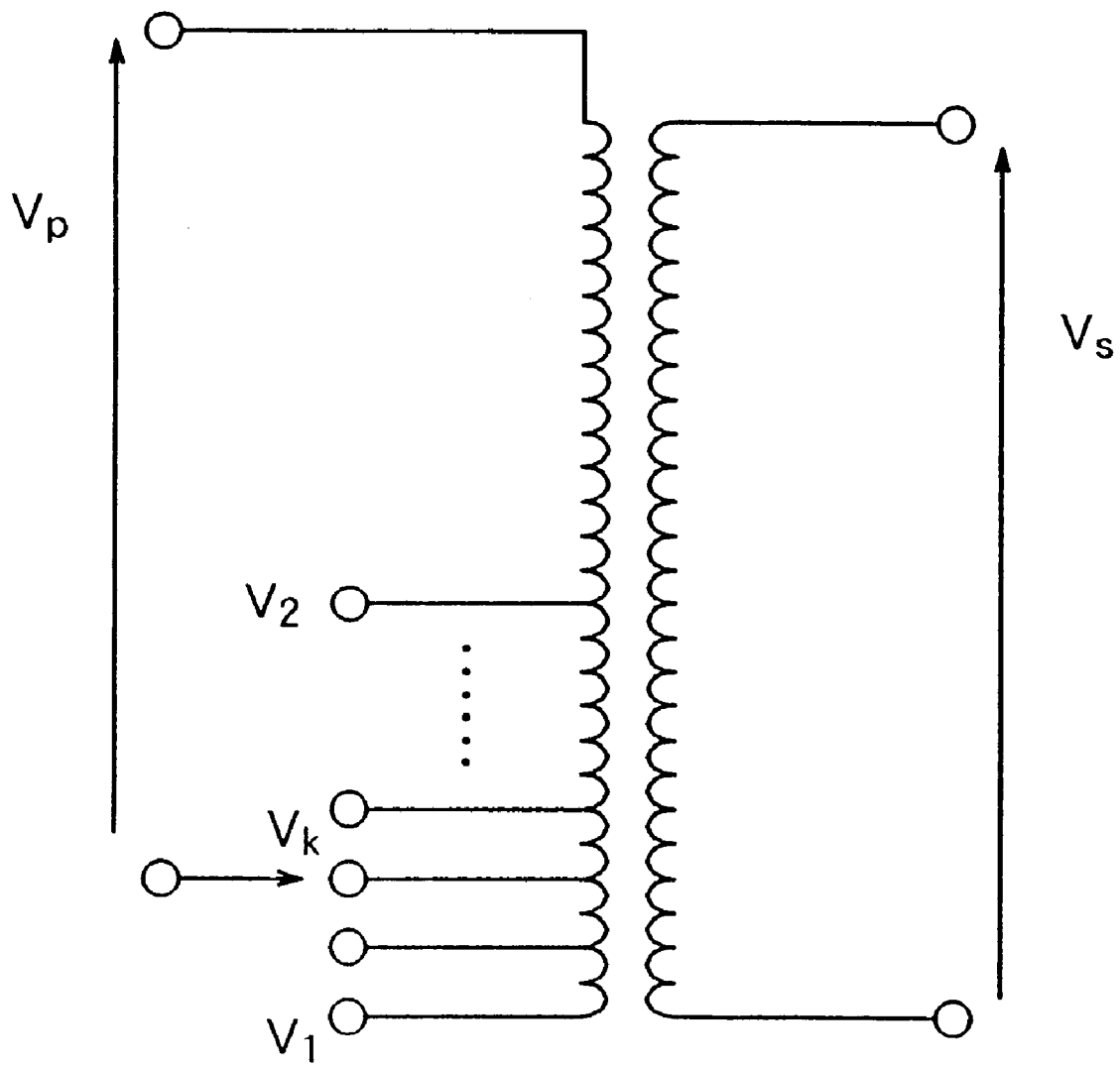
FIG. 6 is a single phase wiring diagram showing a variable-tap-added step-down transformer for one phase.

FIG. 1 is a structural diagram showing a control circuit 10 according to a first embodiment of the present invention, which corresponds to the control circuit 10 in the conventional example shown in FIG. 5. The control circuit is applied to a single phase wiring diagram shown in FIG. 4.

In FIG. 1, the same parts as those in the conventional example shown in FIG. 5 are designated by like reference numerals, and their description is omitted. As new reference numerals, reference numeral 15 denotes a tap change judging circuit for judging whether an inverter current $I_a$ of an inverter unit 5 should be outputted at a rated value or more, or not; 16, an inverter tap command circuit for changing a variable tap from the inverter unit 5, with a time delay; 17, a tap command value selecting circuit for selecting any one of an output of the tap command circuit 14 due to a system voltage $V_0$ and an output of the tap command circuit 16 due to the inverter.

Then, the operation of the control circuit 10 thus structured will be described.

In order to output a reactive power at a rated reactive power or more, a tap of the variable-tap-added step-down transformer 2 is raised to lower its secondary voltage $V_s$ so that an inverter voltage $V_a$ inputted to an a.c.-d.c. transformer 1 is lowered. As a result, an inverter rated voltage $V_{a1}$, when the inverter current $I_a$ is zero, is lowered to increase a difference voltage between a d.c. voltage $E_d$ and a peak value ($\sqrt{2} \times V_{a1}$) (a value smaller than ($\sqrt{2} \times V_{a0}$)) of the inverter rated voltage $V_{a1}$. In this state, because the active power output is zero, the inverter current $I_a$ becomes a reactive current $i_q$.

An upper limit $I_{q2}$ of the phase-advanced reactive current $I_q$ is represented by the following expression on the basis of the relational expression (3), assuming that it is a controllable maximum current or less of the device.

$$I_{q2} = \left(E_d / \left(\sqrt{2} \times V_{a1}\right) - 1\right) / X_a \tag{6}$$

and $$I_{q2} / I_{q0} = \left\{\left[E_d / \left(\sqrt{2} \times V_{a1}\right) - 1\right] / X_a\right\} / \tag{7}$$
$$\left\{\left[E_d / \left(\sqrt{2} \times V_{a0}\right) - 1\right] / X_a\right\}$$
$$= \left[E_d / \left(\sqrt{2} \times V_{a1}\right) - 1\right] /$$
$$\left[E_d / \left(\sqrt{2} \times V_{a0}\right) - 1\right]$$
$$> 1$$

Thus, it is understood that the upper limit $I_{q2}$ becomes larger than $I_{q0}$.

Upon detecting that the inverter current Ia has reached a rated value, the tap change judging circuit 15 judges that the inverter current $I_a$ at the rated value or more is outputted, and an appropriate tap value is outputted by the inverter tap command circuit 16. Then, one of the output of the tap command circuit 14 due to the system voltage $V_0$ and the output of the inverter tap command circuit 16 is selected by the tap command selecting circuit 17, and a tap of the variable-tap-added step-down transformer 2 is changed by the tap changing circuit 18.

Although both of the inverter tap command circuit 16 and the tap command circuit 14 include a time delay element, the shorter delay is operated with priority in the tap command selecting circuit 17.

In order to output an active power at a rated active power or more, the tap of the variable-tap-added step-down transformer 2 is lowered to raise the secondary voltage $V_s$ so that an inverter voltage Va is raised. As a result, an inverter rated voltage $V_{a2}$, when the inverter current Ia is zero, is raised. In this state, a difference voltage between the d.c. voltage $E_d$ and the peak value ($\sqrt{2} \times V_{a2}$) (a value larger than ($\sqrt{2} \times V_{a1}$)) of the inverter rated voltage $V_{a2}$ is reduced. In this state, because the active power output is zero, the inverter current Ia becomes a reactive current $i_p$.

An upper limit $I_{p2}$ of the current $I_p$ is represented by the following expression on the basis of the relational expression (5), assuming that it is a controllable maximum current or less of the device.

$$I_{p2} = \left[\sqrt{\left(\left(E_d / \left(\sqrt{2} \times V_{a2}\right)\right)^2 - 1\right)}\right] / X_a \tag{8}$$

and $$I_{p2} / I_{p0} = \left\{\left[\sqrt{\left(\left(E_d / \left(\sqrt{2} \times V_{a2}\right)\right)^2 - 1\right)} / X_a\right]\right\} / \tag{9}$$
$$\left\{\left[\sqrt{\left(\left(E_d / \left(\sqrt{2} \times V_{a0}\right)\right)^2 - 1\right)} / X_a\right]\right\}$$
$$= \sqrt{\left\{\left(\left(E_d / \left(\sqrt{2} \times V_{a2}\right)\right)^2 - 1\right) / \right.}$$
$$\left.\left\{\left(\left(Ed / \left(\sqrt{2} \times V_{a0}\right)\right)^2 - 1\right)\right\}\right.$$
$$> 1$$

Thus, it is understood that the upper limit $I_{p2}$ becomes larger than $I_{p0}$.

Upon detecting that the inverter current Ia has reached a rated value, the tap change judging circuit 15 judges that the rated inverter current Ia or more is outputted, and an appropriate tap value is outputted by the inverter tap command circuit 16. Then, any one of the output of the tap command circuit 14 due to the system voltage $V_0$ and the output of the inverter tap command circuit 16, which makes the inverter current Ia smaller, is selected by the tap command selecting circuit 17, and the tap position of the variable-tap-added step-down transformer 2 is changed by the tap changing circuit 18.

Although both of the inverter tap command circuit 16 and the tap command circuit 14 include a time delay element, the shorter is operated with priority in the tap command selecting circuit 17.

(Second Embodiment)

Figure 2:
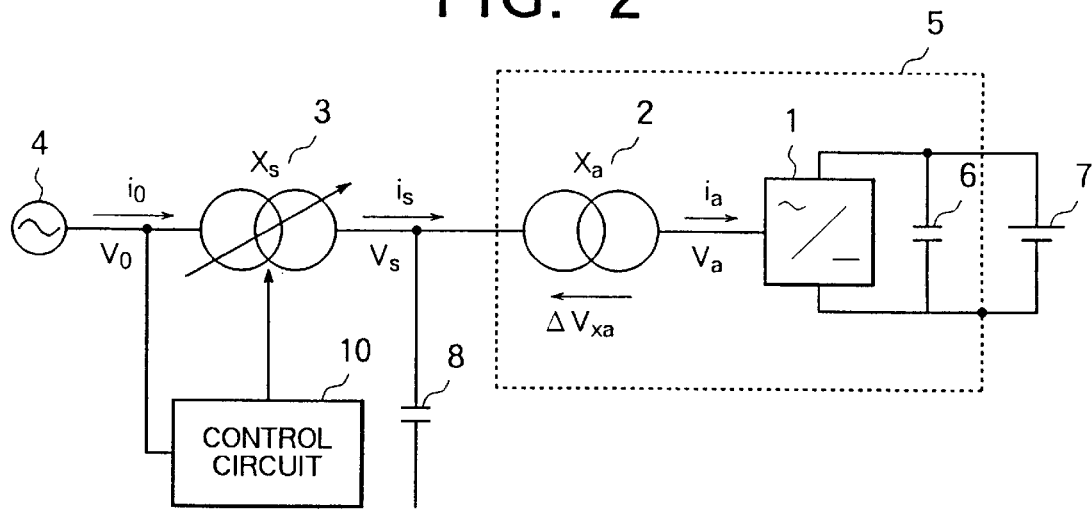
FIG. 2 is a single phase wiring diagram showing an inverter control unit according to a second embodiment of the present invention.

The first embodiment is applied to a case in which an equipment connected to a secondary side of the variable-tap-added step-down transformer 3 is only the inverter unit 5. However, as shown in FIG. 2, the provision of a fixed-capacitance capacitor equipment 8 enables the secondary voltage Vs to be raised even if the tap of the variable-tap-added step-down transformer 3 is not changed.

The fixed-capacitance capacitor equipment 8 is controlled to be closed when the phase-advanced capacitance of the inverter current $I_a$ exceeds a set value $Q_1$, and to be opened when the phase-advanced capacitance is lower than a set value $Q_2$ (in general, $Q_1 > Q_2$).

Also, since the inverter unit 5 controls the reactive power so that a voltage variation occurring when the fixed capacitance capacitor equipment 8 is closed and opened is transitionally softened to maintain the system voltage constant, a voltage fluctuation given to the system by the fixed-capacitance capacitor 8 can be restrained.

(Third Embodiment)

Figure 3:
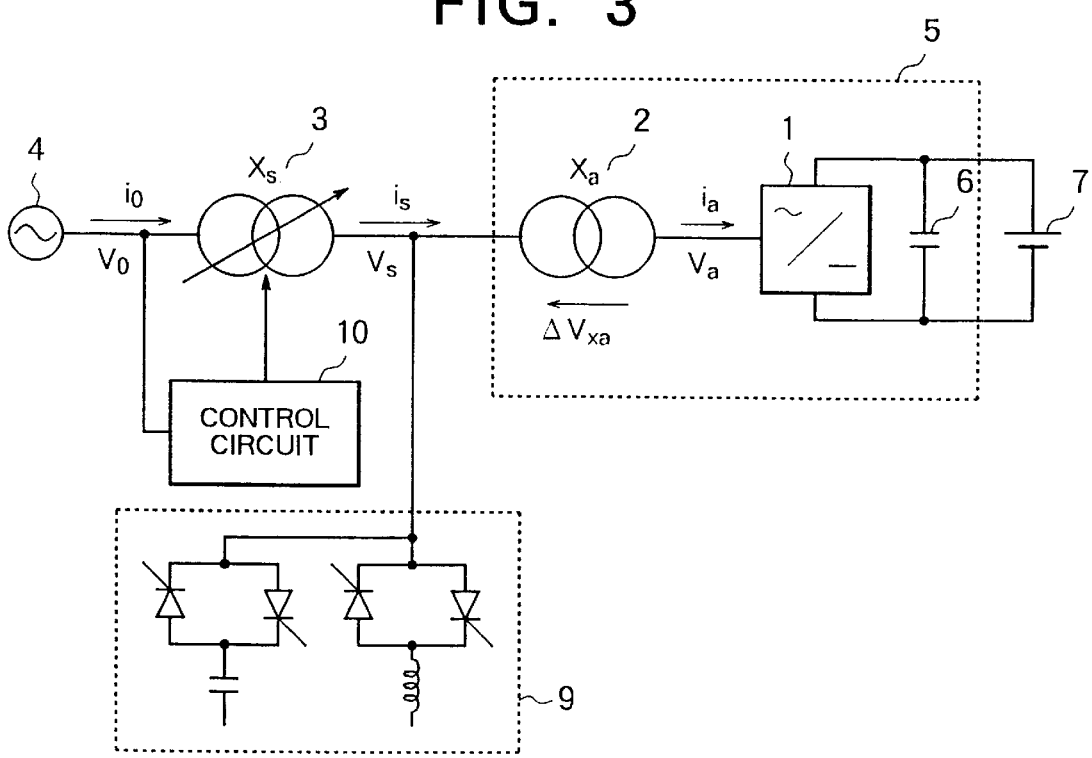
FIG. 3 is a single phase wiring diagram showing an inverter control unit according to a third embodiment of the present invention.

The first embodiment is applied to a case in which the equipment connected to a secondary side of the variable-tap-added step-down transformer 3 is only the inverter unit 5. However, as shown in FIG. 3, the provision of a reactive power compensating unit 9 having a variable capacitance enables the secondary voltage $V_s$ to be raised even if the tap of the variable-tap-added step-down transformer 3 is not changed. In addition, a voltage fluctuation in the system occurring when the fixed capacitance capacitor equipment 8 is closed and opened in the second embodiment can be controlled by the reactive power compensating unit 9 having the variable capacitance so that the system voltage is held constant by momentarily discharging or absorbing the reactive power output, thereby restraining the voltage fluctuation of the system.

Also, in the first to third embodiments, the inverter transformer 2 is described. Alternatively, the present invention may be applied to a case where an inverter reactor is provided with the same advantages as those in the first to third embodiments.

As is described above, according to the present invention, since reactive power equal to the rated value or more of the inverter current can be outputted, or active power at the rated value or more of the inverter current can be outputted, an over-load rating can be provided for the inverter unit. Also, the tap of the step-down transformer is controlled so that the margin of the inverter unit is restrained to the minimum, thereby making the costs per capacitance lower. Further, in comparison with the conventional inverter unit where the d.c. voltage $E_d$ of the inverter unit is designed to be higher, taking an increase of the system voltage $V_s$ into account, the present invention is advantageous in that the tap of the variable-tap-added step-down transformer is changed to prevent waste.

Also, with the provision of the fixed-capacitance capacitor equipment at the secondary side of the variable-tap-added step-down transformer, the secondary voltage $V_s$ can be raised, even if the variable-tap-added step-down transformer is not changed, and the inverter unit can control reactive power so that the voltage fluctuation occurring when the fixed-capacitance capacitor equipment is closed and opened is transitionally softened, thereby restraining the voltage fluctuation given to the system by the fixed-capacitance capacitor equipment.

Still further, with the provision of the reactive power compensating unit having a variable capacitance at the secondary side of the variable-tap-added step-down transformer, the secondary voltage $V_s$ can be raised, even if the variable-tap-added step-down transformer is not changed, and, since the reactive power output can be gradually increased or decreased by the reactive power compensating unit having a variable capacitance, the voltage fluctuation given to the system can be restrained.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments are chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inverter control unit comprising:

an inverter unit for producing a voltage and a current and having a rated output voltage and rated output current, said inverter unit controlling active power and reactive power output and received;

a variable-tap-added step-down transformer, including a variable position tap, for linking said inverter unit to a transmission line of a power system;

a direct current (DC) energy unit connected to a DC side of said inverter unit for supplying or consuming active power; and control means for controlling the variable position tap of said variable-tap-added step-down transformer, wherein said control means includes:

an effective value calculating circuit for calculating a magnitude of a system voltage of the power system;

a setting circuit for setting a magnitude command value of the system voltage;

a deviation calculating circuit for calculating deviation between the magnitude of the system voltage and the magnitude command value of the system voltage;

a tap command circuit for outputting a tap command value in response to the deviation, with a time delay;

a tap change judging circuit for determining whether an inverter current of at least the rated current is output when a change in position of the variable position tap of said variable-tap-added step-down transformer is made;

an inverter tap command circuit for changing the tap command value in response to a determination of said tap change judging circuit;

a tap command value selecting circuit for selecting one of the tap command value from said tap command circuit and the tap command value from said inverter tap command circuit; and a tap changing circuit for changing the position of the variable position tap of said variable-tap-added step-down transformer in response to the tap command value selected by said tap command value selecting circuit.

2. The inverter control unit as claimed in claim 1, comprising a fixed-capacitance capacitor connected to an output side of said variable-tap-added step-down transformer.

3. The inverter control unit as claimed in claim 1, comprising a reactive power compensating unit having a variable capacitance connected to an output side of said variable-tap-added step-down transformer.

4. An inverter control unit comprising:
   an inverter unit for producing a voltage and a current and having a rated output voltage and rated output current, said inverter unit controlling active power and reactive power output and received;
   a variable-tap-added step-down transformer including a variable position tap, for linking said inverter unit to a transmission line of a power system having a system voltage;
   a direct current (DC) energy unit connected to a DC side of said inverter unit for supplying or consuming active power; and
   a control unit for controlling the variable position tap of said variable-tap-added step-down transformer, wherein said control unit includes:
      a tap changing judging circuit for determining whether an inverter current of at least the rated current is output;
      an inverter tap command circuit for outputting the tap command value in response to a determination of said tap change judging circuit; and
      a tap changing circuit for changing the position of the variable position tap of said variable-tap-added step-down transformer in response to the tap command value from said inverter tap command circuit.

5. The inverter control unit as claimed in claim 4 comprising:
   a tap command circuit for outputting a tap command value in response to magnitude of the system voltage; and
   a tap command value selecting circuit for selecting one of the tap command value from said tap command circuit and the tap command value from said inverter tap command circuit, wherein said tap changing circuit changes the position of the variable position tap of said variable-tap-added step-down transformer in response to the tap command value selected by said tap command value selecting circuit.

6. The inverter control unit as claimed in claim 5, comprising:
   a system voltage magnitude calculating circuit for calculating the magnitude of the system voltage;
   a setting circuit for setting a command value of the system voltage; and
   a deviation calculating circuit for calculating a deviation between the magnitude of the system voltage and the command value of the system voltage from said setting circuit, wherein said tap command circuit outputs a tap command value in response to the deviation.

7. The inverter control unit as claimed in claim 5, wherein said tap command circuit outputs the tap command value with a time delay.

8. The inverter control unit as claimed in claim 4, wherein said inverter tap command circuit outputs the tap command value with a time delay.

9. The inverter control unit as claimed in claim 4, wherein said tap changing circuit changes the position of the variable position tap of said variable-tap-added step-down transformer in two opposite directions.

10. The inverter control unit as claimed in claim 4, comprising a capacitor connected to a transmission line linked to said inverter unit by said variable-tap-added step-down transformer.

11. The inverter control unit as claimed in claim 4, comprising a reactive power compensating unit having a variable capacitance connected to a transmission line linked to said inverter unit by said variable-tap-added step-down transformer.

* * * * *